(12) United States Patent
Zhao (10) Patent No.: US 11,763,104 B2
(45) Date of Patent: Sep. 19, 2023

(54) SLIDE RULE STYLE FLIGHT COMPUTER

(71) Applicant: Cya Aviation Tech Ltd, Shanghai (CN)

(72) Inventor: Chongchao Zhao, Shanghai (CN)

(73) Assignee: Cya Aviation Tech Ltd, Shanghai (CN)

( * ) Notice: Subject to any disclaimer, the term of this patent is extended or adjusted under 35 U.S.C. 154(b) by 607 days.

(21) Appl. No.: 16/795,581

(22) Filed: Feb. 20, 2020

(65) Prior Publication Data

US 2020/0283164 A1 Sep. 10, 2020

(30) Foreign Application Priority Data

Mar. 7, 2019 (CN) .......................... 201920290946.4

(51) Int. Cl.
*G06G 1/08* (2006.01)
*G06G 1/06* (2006.01)
*G01C 21/20* (2006.01)
*G06G 1/00* (2006.01)

(52) U.S. Cl.
CPC .............. *G06G 1/0052* (2013.01); *G06G 1/08* (2013.01); *G01C 21/20* (2013.01); *G06G 1/06* (2013.01)

(58) Field of Classification Search
CPC .......... G06G 1/0052; G06G 1/08; G06G 1/06; G01C 21/20
See application file for complete search history.

(56) References Cited

U.S. PATENT DOCUMENTS

| 2,239,959 | A | * | 4/1941 | Gray | G01C 21/20 235/78 R |
| 3,203,101 | A | * | 8/1965 | Brown | G01C 21/20 33/431 |
| 3,231,188 | A | * | 1/1966 | Warner | G06G 1/0052 235/84 |
| 3,350,007 | A | * | 10/1967 | Urben | G06G 1/0052 235/88 N |
| 3,630,435 | A | * | 12/1971 | Titus | G01C 21/20 235/78 R |
| 4,274,204 | A | * | 6/1981 | Self | G06G 1/0052 235/61 B |

FOREIGN PATENT DOCUMENTS

CN 209357061 U * 9/2019

* cited by examiner

*Primary Examiner* — Michael C Zarroli (57) ABSTRACT

This invention relates to a slide rule style flight computer. The front disc and the back disc are connected and fixed by positioning clips. The front disc includes a front base disc and a front rotary disc. The front rotary disc is rotatably fixed on the front base disc. The front disc includes a front base disc and a front rotary disc. The front rotary disc is rotatably fixed on the front base disc.

5 Claims, 10 Drawing Sheets

SLIDE RULE STYLE FLIGHT COMPUTER

CROSS REFERENCE TO RELATED APPLICATIONS

The present application claims the benefit of Chinese Patent Application No. 201920290946.4 filed on Mar. 7, 2019, the contents of which are incorporated herein by reference in their entirety.

BACKGROUND OF THE INVENTION

1. Field of the Invention

Embodiments of the invention generally relate to surveying and mapping in the field of aviation, and more particularly to a slide rule style flight computer.

2. Discussion of the State of the Art

In the field of aviation flight training and the daily work of professional pilots, a kind of flight computer is commonly used. At present, the flight computers are mostly made of aluminum, paperboard or rigid plastic material. Printings on aluminum or rigid plastic version flight computer is always easily rubbed off. The paperboard flight computer is an economical version and will be useless once it drops into water.

SUMMARY OF THE INVENTION

In an embodiment, the flight computer contains a front disc and a back disc. The front disc and the back disc are connected and fixed by positioning clips. The front disc includes a front base disc and a front rotary disc. The front rotary disc is rotatably fixed on the front base disc. The back disc includes a back base disc and a back rotary disc. The back rotary disc is rotatably fixed on the back base disc. The positioning clips include a left positioning clip and a right positioning clip. The upper side of the left positioning clip is connected and fixed with the bottom side of the front base disc. The bottom side of the left positioning clip is connected and fixed with the upper side of the back base disc, and the upper side of the right positioning clip is connected and fixed with the bottom side of the front base disc. The bottom side of the right positioning clip is connected and fixed with the upper side of the back base disc. A plug-in card is arranged between the left positioning clip and the right positioning clip. The plug-in card can move can be pulled and moved between the left positioning clip and the right positioning clip, and between the front base disc and the back base disc. The plug-in card is respectively connected with the left positioning clip and the right positioning clip respectively. Damping generating device is arranged on one side of the right positioning clip close to the plug-in card.

In another embodiment, the materials of the front base disc and the front rotary disc may be transparent plastic.

In yet another embodiment, the materials of the back base disc and the back rotary disc may be transparent plastic.

In still another embodiment, the bottom side of the front base disc and the bottom side of the front rotary disc are printed with degree scales and texts, the degree scales and texts on the bottom side of the front base disc are covered with ink layers, the ink layers on the bottom side of the front base disc are pasted with a protective film, the degree scales and texts on the bottom side of the front rotary disc are covered with ink layers, and the ink layers on the bottom side of the front rotary disc are covered with ink layers, the ink layers on the bottom side of the front rotary disc are pasted with a protective film.

In yet another embodiment, the upper side of the back base disc and the upper side of the back rotary disc may be printed with degree scales and texts. The degree scales and texts on the upper side of the back base disc are covered with ink layers. The ink layers on the upper side of the back base disc are covered with a protective film. The degree scales and texts on the upper side of the back rotary disc are covered with ink layers. The ink layers on the upper side of the back rotary disc are pasted with a protective film.

BRIEF DESCRIPTION OF THE DRAWINGS

In order to explain the embodiment of the invention or the technical solution in the prior art more clearly, the following will make a brief introduction to the appended drawings needed in the embodiment or the prior art description. Obviously, the appended drawings in the following description are only some embodiments of the invention. Extra drawings which can be obtained without any additional workforce for those skilled people in the prior art are incorporated in this invention.

Reference figures: 1. Flight computer; 2. Plug-in card; 3. Left positioning clip; 4. Right positioning clip; 5. Damping generating device

DETAILED DESCRIPTION OF THE INVENTION

The specific embodiments of the invention will be further described in combination with the appended drawings and embodiments. The following embodiments are only used to explain the technical solution of the invention more clearly, and cannot limit the protection scope of the invention.

Figure 1:
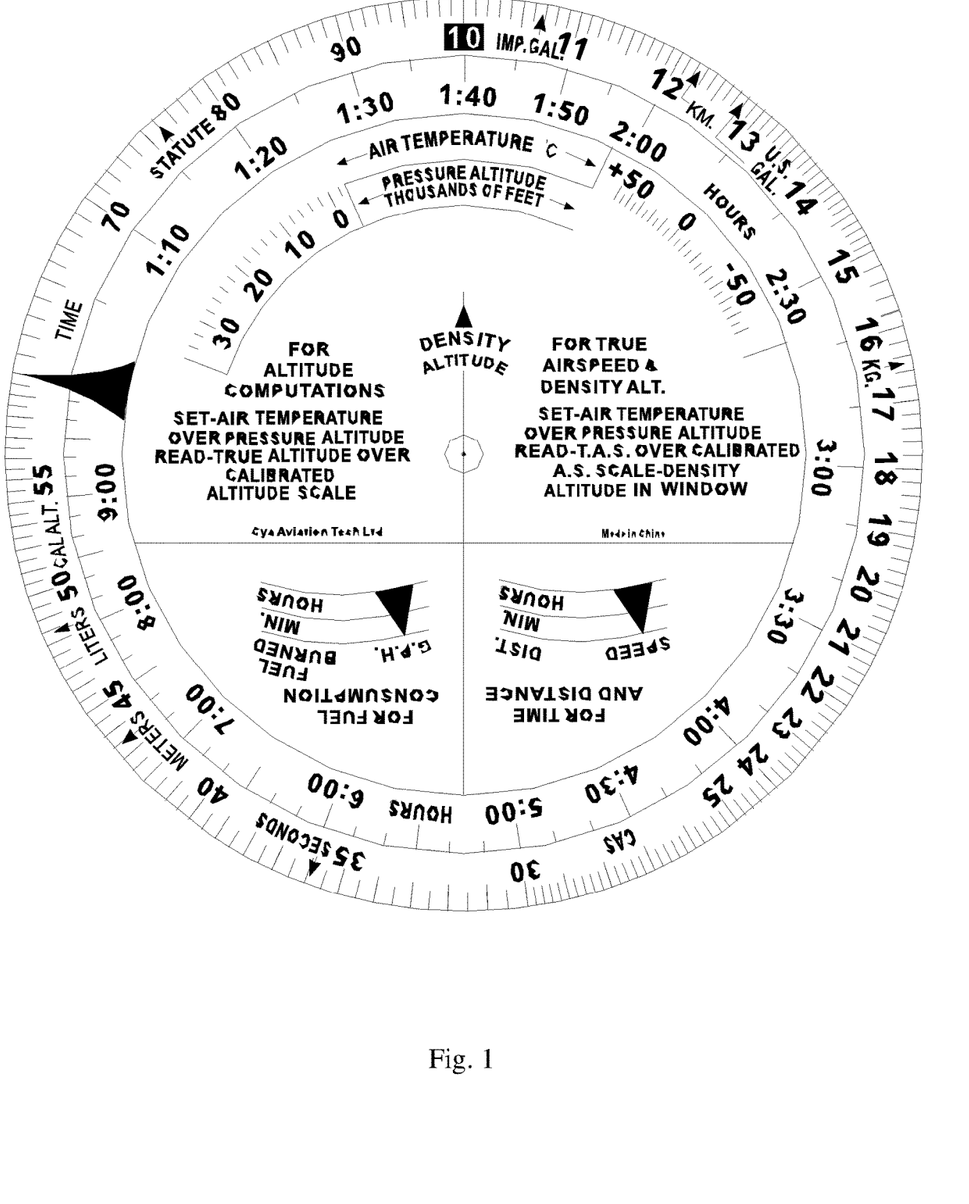
FIG. 1 is the diagrammatic representation of the front rotary disc, according to an embodiment of the invention.
Figure 2:
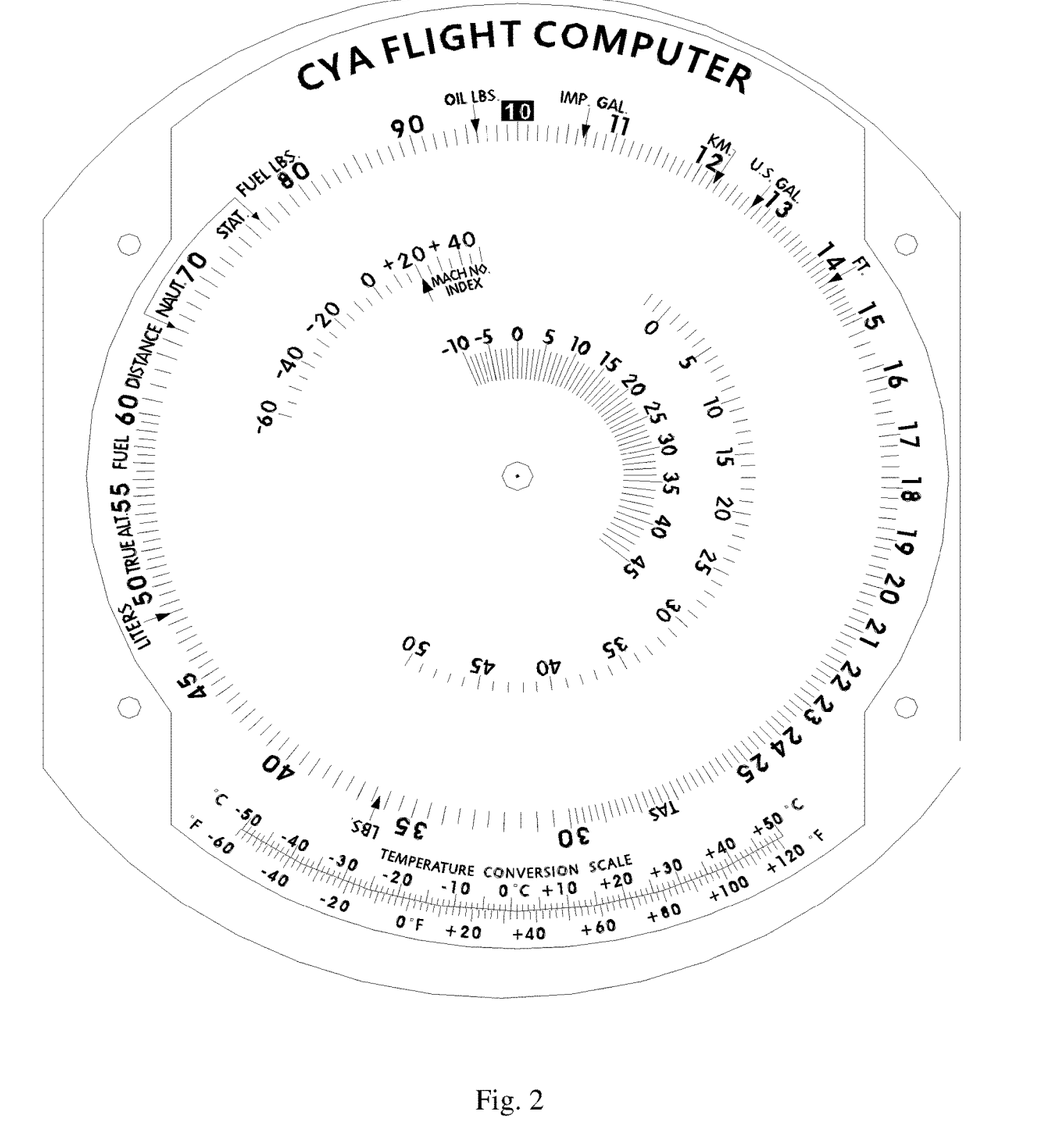
FIG. 2 is the diagrammatic representation of the front base disc, according to an embodiment of the invention.
Figure 3:
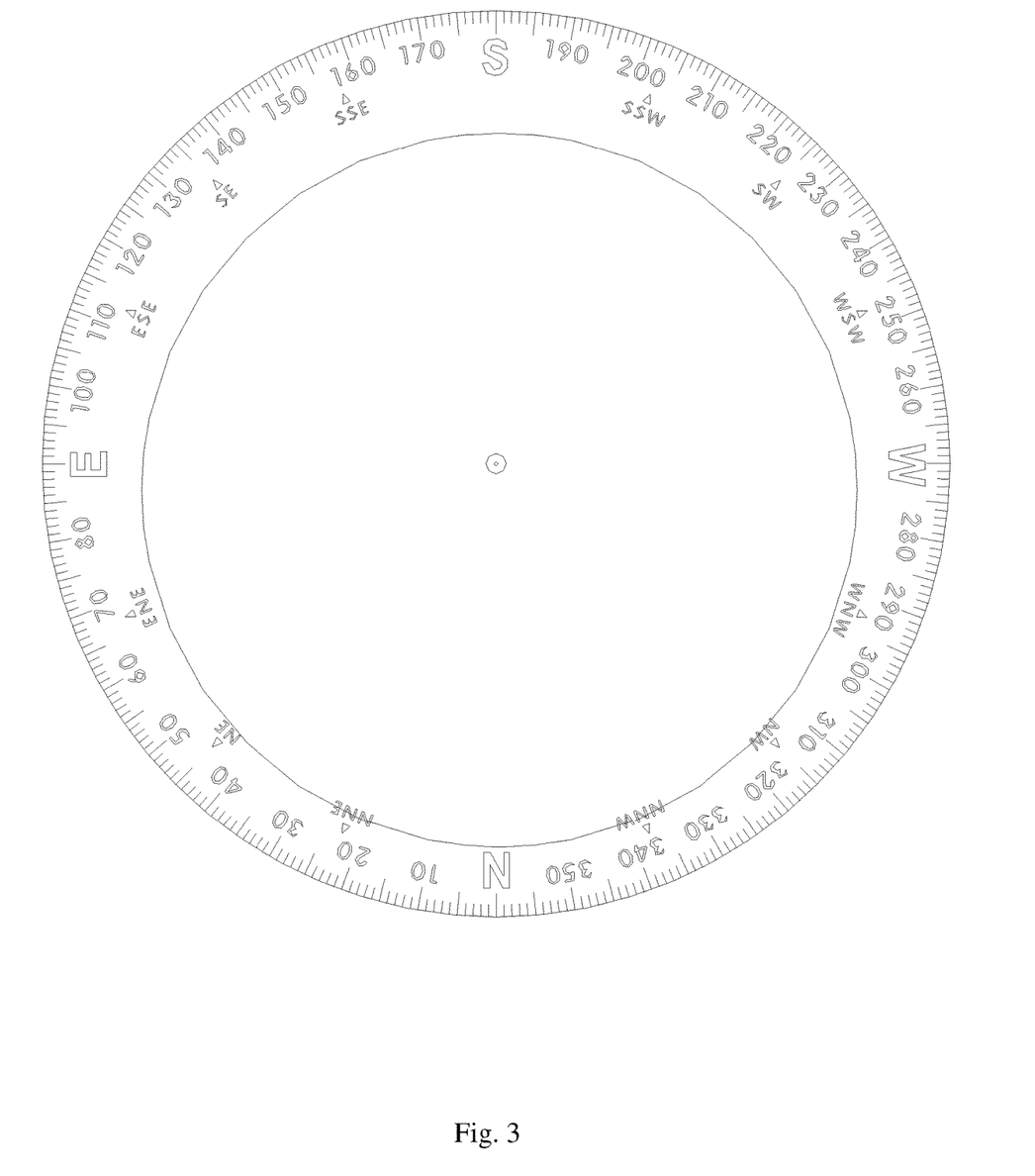
FIG. 3 is the diagrammatic representation of the back rotary disc, according to an embodiment of the invention.
Figure 4:
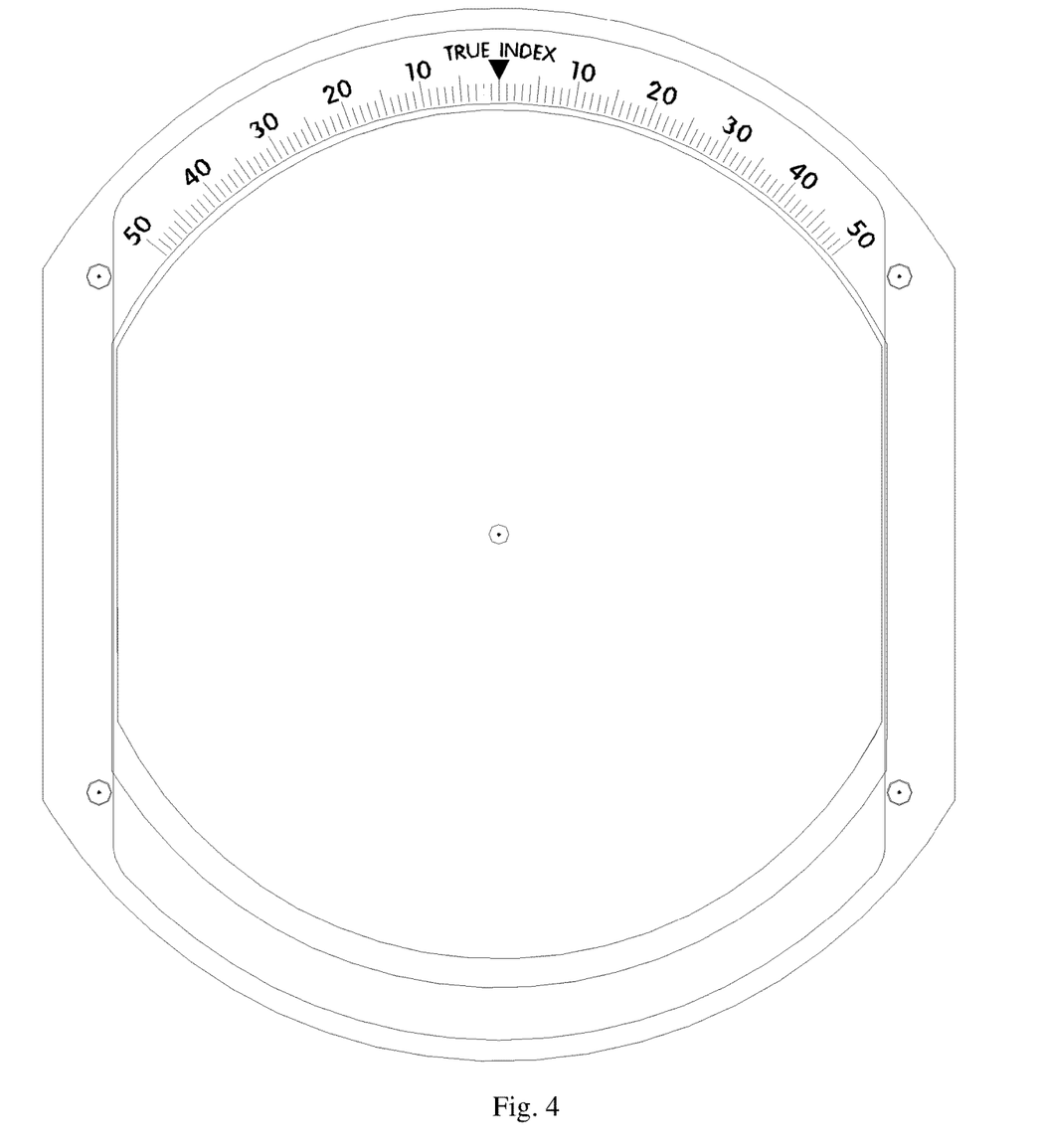
FIG. 4 is the diagrammatic representation of back base disc, according to an embodiment of the invention.
Figure 5:
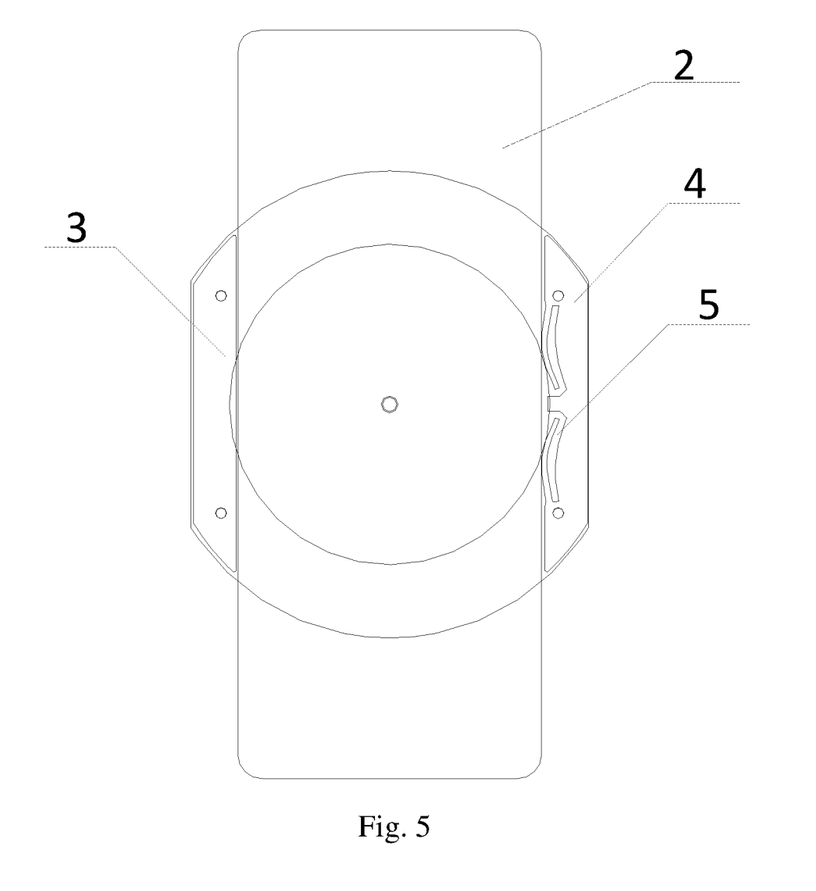
FIG. 5 is the front view diagram of the combination of the front disc, the back disc and the plug-in card, according to an embodiment of the invention.
Figure 6:
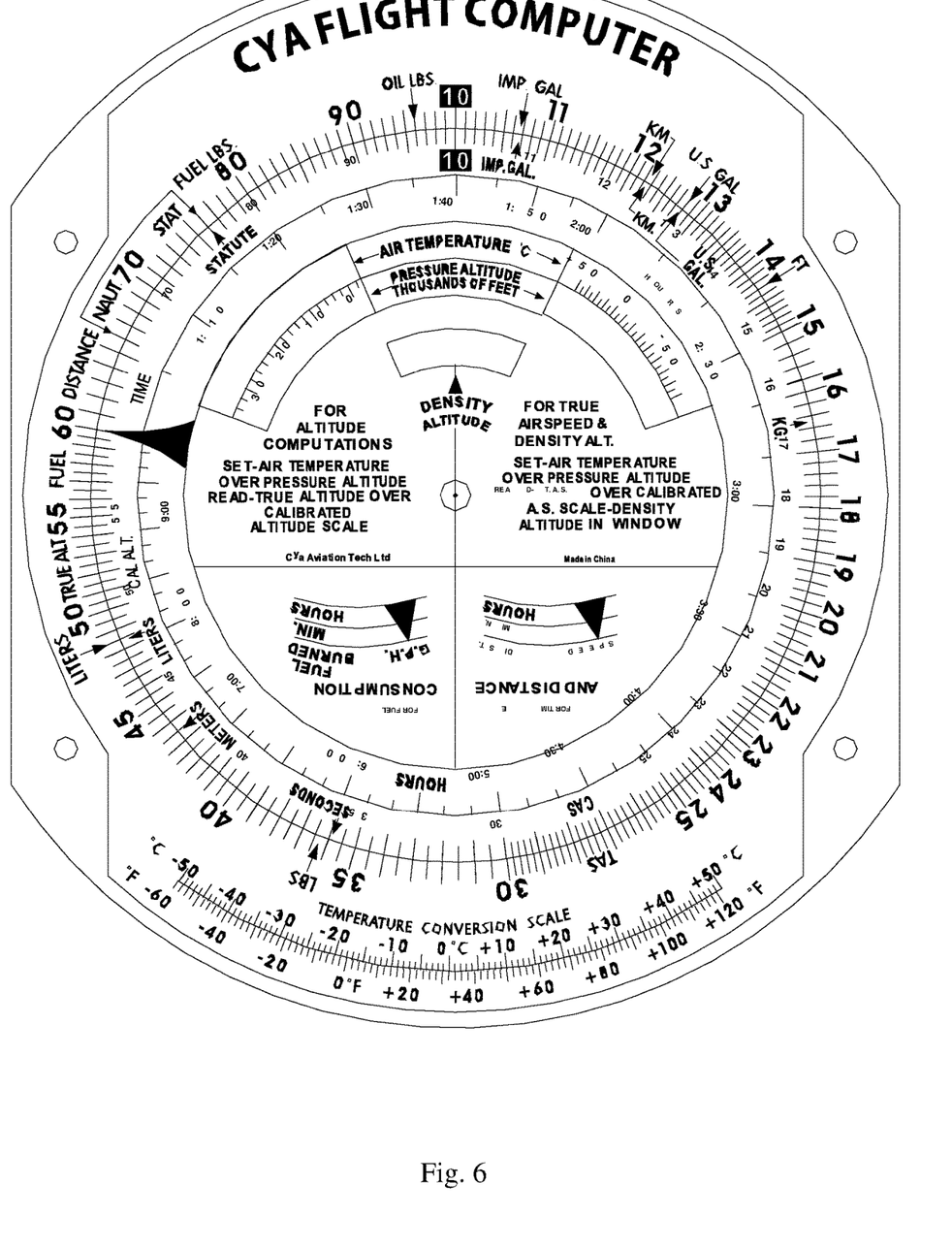
FIG. 6 is the combination diagram of the front disc, according to an embodiment of the invention.
Figure 7:
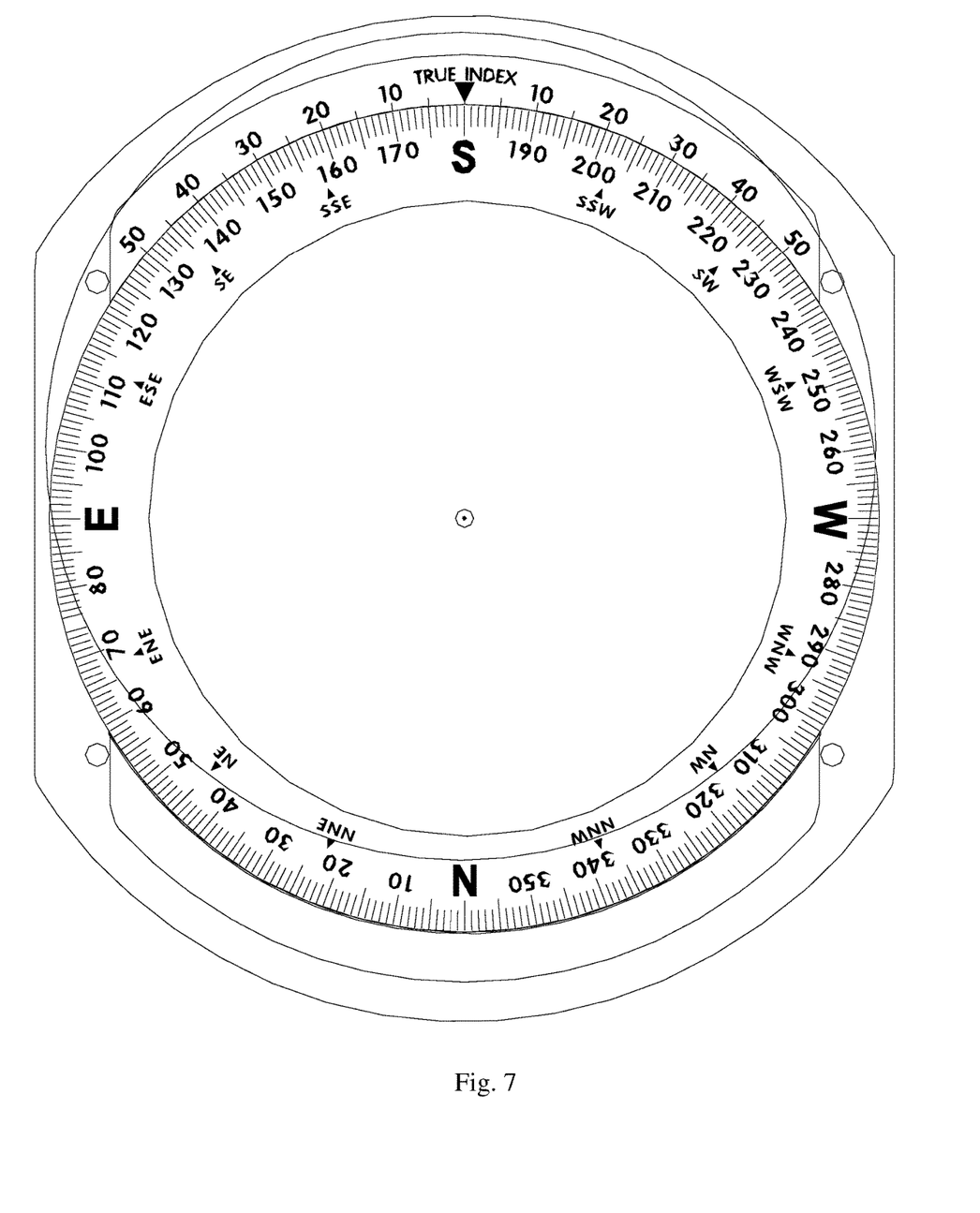
FIG. 7 is the combination diagram of back disc, according to an embodiment of the invention.
Figure 8:
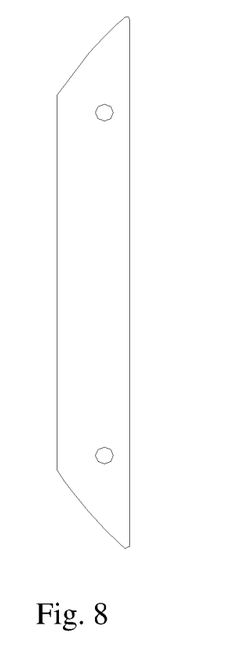
FIG. 8 is the structural diagram of the left positioning clip, according to an embodiment of the invention.
Figure 9:
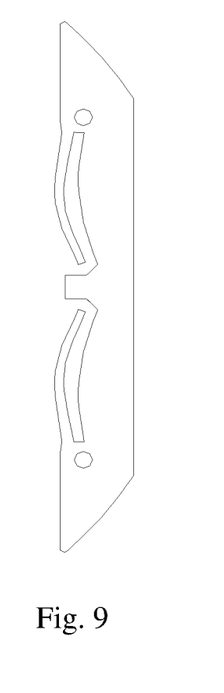
FIG. 9 is the structural diagram of the right positioning clip, according to an embodiment of the invention.
Figure 10:
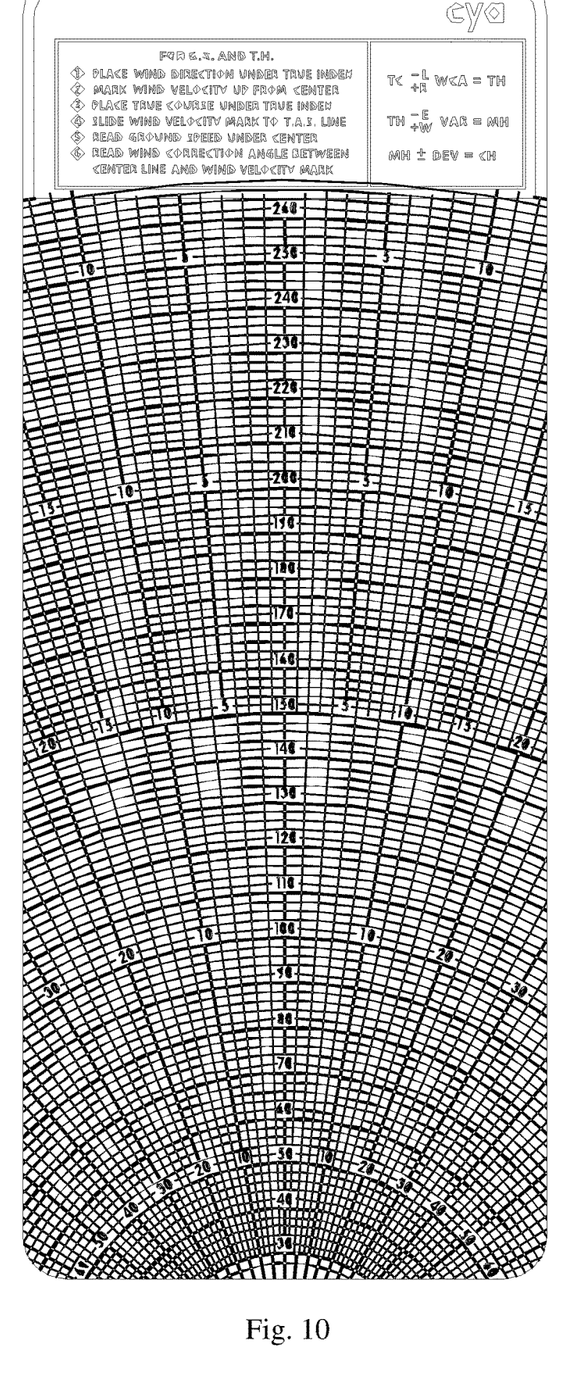
FIG. 10 is the front view structural diagram of the plug-in card, according to an embodiment of the invention.
Figure 11:
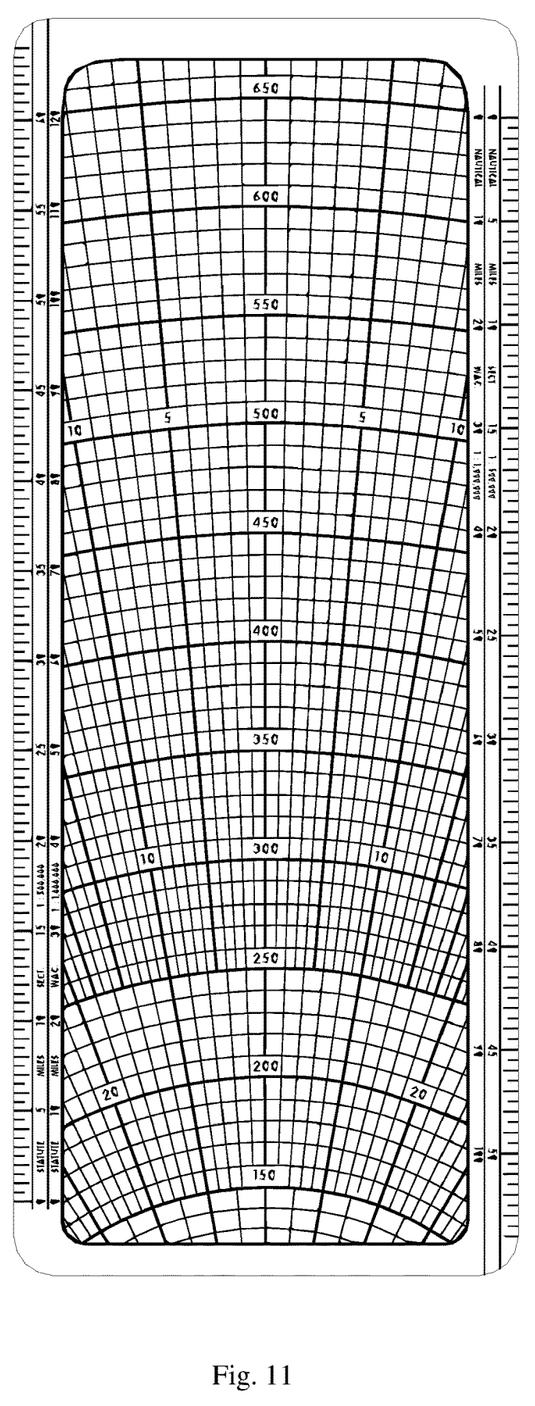
FIG. 11 is the rear view structural diagram of the plug-in card, according to an embodiment of the invention.

As shown in FIG. 1-FIG. 11, the embodiments relate to a slide rule style flight computer, which includes a flight computer 1. The flight computer 1 contains a front disc and a back disc. The front disc and the back disc are connected and fixed by a positioning clips. The front disc includes a front base disc and a front rotary disc. The front rotary disc are rotatably fixed on the front base disc. The back disc includes a back base disc and a back rotary disc, and the back rotary disc are rotatably fixed on the back base disc. Positioning clips includes the left positioning clip 3 and the right positioning clip 4. The upper side of the left positioning clip 3 is connected and fixed with the bottom side of the front base disc. The bottom side of the left positioning clip 3 is connected and fixed with the upper side of the back base disc. The upper side of the right positioning clip 4 is connected and fixed with the bottom side of the front base disc. The bottom side of the right positioning clip 4 is connected and fixed with the upper side of the back base disc, and a plug-in card 2 is arranged between the left positioning clip 3 and the right positioning clip 4. The plug-in card 2 can move can be pulled and moved between the left positioning clip 3 and the right positioning clip 4, and between the front base disc and the back base disc. The plug-in card 2 is respectively connected with the left positioning clip 3 and the right positioning clip 4 respectively. Damping generating device 5 is arranged on one side of the right positioning clip 4 close to the plug-in card 2. The embodiments for the slide rule style flight computers are all durable, waterproof, lightweight, easy-carry and high accuracy.

Specifically, the materials of the front base disc and the front rotary disc may be transparent plastic; the materials of the back base disc and the back rotary disc may be transparent plastic.

In addition, the bottom side of the front base disc and the bottom side of the front rotary disc are printed with degree scales and texts. The degree scales and texts on the bottom side of the front base disc are covered with ink layers. The ink layers on the bottom side of the front base disc is covered with a protective film. The degree scales and texts on the bottom side of the front rotary disc are covered with ink layers. The ink layers on the bottom side of the front rotary disc is covered with a protective film. Through this, the degree scales and texts are definitely not be rubbed off by user in the process. Hence, it can extend its life of use.

The upper side of the back base disc and the upper side of the back rotary disc are printed with degree scales and texts. The degree scales and texts on the upper side of the back base disc are covered with ink layers. The ink layers on the upper side of the back base disc is covered with a protective film. The scales and texts on the upper side of the back rotary disc are covered with ink layers. The ink layers on the upper side of the back rotary disc is covered with a protective film. Through this, the degree scales and texts are definitely not be rubbed off by user in the process. Hence, it can extend its life of use.

In the process of use, it is convenient to measure by rotating the front and back rotary discs while moving the plug-in card 2. When the plug-in card 2 is pulled and moved back and forth between the left positioning clip 3 and the right positioning clip 4, the damping generated by the damping generating device 5 on the right positioning clip 4 can gently position the plug-in card 2 on the left positioning clip 3, so as to prevent the plug-in card 2 from falling off easily. It also improves the accuracy of locating the plug-in card when converting with the rotary disc in the process of inserting. As a layer of protective film is applied on the surface of the degree scales and texts on the front base disc, the front rotary disc, the back base disc and the back rotary disc, the degree scales and texts are definitely not be rubbed off by users in the process. Hence, it extends the life of use.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A slide rule style flight computer comprising: A flight computer comprising of a front disc containing a front base disc and a front rotary disc rotatably fixed on the front base disc and a back disc containing a back base disc and a back rotary disc rotatably fixed on the back base disc, wherein the front disc and the back disc are connected and fixed by positioning clips comprising of a left positioning clip and a right positioning clip, an upper side of the left positioning clip is connected and fixed with a bottom side of the front base disc, a bottom side of the left positioning clip is connected and fixed with an upper side of the back base disc, an upper side of the right positioning clip is connected and fixed with a bottom side of the front base disc, a bottom side of the right positioning clip is connected and fixed with an upper side of the back base disc; wherein a plug-in card clip arranged and respectively connected with the left positioning clip and the right positioning clip can be pulled, inserted and moved between the left positioning clip and the right positioning clip and between the front base disc and the back base disc.

2. The slide rule style flight computer of claim 1, wherein the materials of front base disc and front rotary disc are transparent plastic.

3. The slide rule style flight computer of claim 1, wherein the materials of the back base disc and back rotary disc are transparent plastic.

4. The slide rule style flight computer of claim 2, wherein both the bottom side of the front base disc and the bottom side of the front rotary disc are printed with degree scales and texts, the degree scales and texts on the bottom side of the front base disc are covered with ink layers, the ink layers on the bottom side of the front base disc are pasted with a protective film, the degree scales and texts on the bottom side of the front rotary disc are covered with ink layers, the ink layers on the bottom side of the front rotary disc are pasted with a protective film.

5. The slide rule style flight computer of claim 3, wherein the upper side of the back base disc and the upper side of the back rotary disc are printed with degree scales and texts, the degree scales and texts on the upper side of the back base disc are covered with ink layers, the ink layers on the upper side of the back base disc are pasted with a protective film, the degree scales and texts on the upper side of the back rotary disc are covered with ink layers, the ink layers on upper side of the back rotary disc are pasted with a protective film.

* * * * *